(12) United States Patent
Yokoyama

(10) Patent No.: US 11,980,987 B2
(45) Date of Patent: May 14, 2024

(54) WORKPIECE PROCESSING METHOD

(71) Applicant: DISCO CORPORATION, Tokyo (JP)

(72) Inventor: Junki Yokoyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 742 days.

(21) Appl. No.: 17/141,352

(22) Filed: Jan. 5, 2021

(65) Prior Publication Data

US 2021/0213639 A1 Jul. 15, 2021

(30) Foreign Application Priority Data

Jan. 9, 2020 (JP) .................................. 2020-002051

(51) Int. Cl.
| | | |
|---|---|---|
| B24B 53/12 | (2006.01) | |
| B23C 3/30 | (2006.01) | |
| B23Q 3/08 | (2006.01) | |
| B28D 1/24 | (2006.01) | |
| B28D 5/02 | (2006.01) | |
| B28D 7/04 | (2006.01) | |

(52) U.S. Cl.
CPC ................ *B23Q 3/088* (2013.01); *B23C 3/30* (2013.01); *B23C 2220/36* (2013.01); *Y10T 409/20* (2015.01); *Y10T 409/303752* (2015.01)

(58) Field of Classification Search
CPC ......... Y10T 409/20; Y10T 409/303752; Y10T 409/303808; Y10T 409/304424; Y10T 409/502624–503116; B23C 3/28–3/355; B23C 2220/36–2220/366; B24B 19/02–19/06; B23D 1/26; B23D 3/02
USPC ..... 409/63, 131–132, 143, 304–307; 451/56, 451/443
See application file for complete search history.

(56) References Cited

U.S. PATENT DOCUMENTS

| | | | | |
|---|---|---|---|---|
| 5,399,049 A | * | 3/1995 | Abe .......................... | B23D 1/26 409/293 |
| 2008/0156061 A1 | * | 7/2008 | Kondou ................ | B23P 15/243 72/324 |

FOREIGN PATENT DOCUMENTS

| | | | | |
|---|---|---|---|---|
| JP | 62-120918 A | * | 6/1987 | |
| JP | 2000-306864 A | * | 11/2000 | |
| JP | 2004-207591 A | * | 7/2004 | |
| JP | 2004-288961 A | * | 10/2004 | |
| JP | 2008-300555 A | * | 12/2008 | |
| JP | 2011-083840 A | * | 4/2011 | |
| JP | 2013179997 A | | 9/2013 | |

(Continued)

OTHER PUBLICATIONS

Machine Translation of JP 62-120918 A, which JP '918 was published Jun. 1987.*

(Continued)

*Primary Examiner* — Erica E Cadugan
(74) *Attorney, Agent, or Firm* — Greer, Burns & Crain, Ltd.

(57) ABSTRACT

A workpiece processing method includes: a dresser preparing step of preparing a dresser of a predetermined thickness; a fixing step of fixing the workpiece and the dresser on a support member adjacently to each other in a first direction; a holding step of holding the support member by a holding table, after the fixing step is performed; and a cutting step of positioning a tool edge of the cutting blade at a predetermined height and cutting the workpiece and the dresser in the first direction by a cutting blade, after the holding step is performed.

6 Claims, 7 Drawing Sheets

(56) References Cited

FOREIGN PATENT DOCUMENTS

JP          2014-024135  A   *   2/2014

OTHER PUBLICATIONS

Machine Translation of JP 2000-306864 A, which JP '864 was published Nov. 2000.*
Machine Translation JP 2011-083840 A, which JP '840 was published Apr. 2011.*
Machine Translation JP 2004-207591 A, which JP '591 was published Jul. 2004.*
Machine Translation of JP 2011-083840 A, which JP '840 was published Apr. 2011.*
Machine Translation of JP 2004-207591 A, which JP '591 was published Jul. 2004.*

* cited by examiner

WORKPIECE PROCESSING METHOD

BACKGROUND OF THE INVENTION

Field of the Invention

The present invention relates to a processing method for grooving a workpiece in a specific direction by a cutting blade.

Description of the Related Art

Conventionally, as disclosed in Japanese Patent Laid-open No. 2003-179997, for example, as an ultrasonic oscillator for use in a medical ultrasonic examination apparatus or the like, one in which rectangular vibrators are arranged in an array has been known.

In Japanese Patent Laid-open No. 2003-179997, it is described that grooving of a workpiece stacked on a backing material is conducted by a cutting blade.

SUMMARY OF THE INVENTION

When grooving of a workpiece as disclosed in Japanese Patent Laid-open No. 2003-179997 is conducted by a cutting blade, dulling, clogging or the like of the cutting blade may be generated during processing. In such a case, a problem of formation of an oblique groove by oblique cutting or a problem of chipping in the workpiece may be generated, so that there is a fear of worsening of processing quality.

Particularly, in a case where the workpiece is an ultrasonic oscillator, grooving is conducted a plurality of times in parallel to a specific direction, and, even in a case where defective processing occurs with respect to one groove, defective operation is generated, leading to a defective product.

Accordingly, it is an object of the present invention to provide a processing method for grooving a workpiece in a specific direction by a cutting blade, by which it is possible to reduce generation of defective products through enhancement of processing quality.

In accordance with an aspect of the present invention, there is provided a workpiece processing method for grooving a workpiece along a first direction by a cutting blade. The workpiece processing method includes a dresser preparing step of preparing a dresser of a predetermined thickness, a fixing step of fixing the workpiece and the dresser on a support member adjacently to each other in the first direction, a holding step of holding the support member by a holding table, after the fixing step is performed, and a cutting step of positioning a tool edge of the cutting blade at a predetermined height and cutting the workpiece and the dresser in the first direction by the cutting blade, after the holding step is performed.

Preferably, in the fixing step, the dressers are fixed on both sides of the workpiece in the first direction.

Preferably, in the fixing step, the workpieces are fixed on both sides of the dresser in the first direction.

Preferably, in the fixing step, a plurality of the dressers and a plurality of the workpieces are fixed alternately in the first direction.

According to the configuration of the present invention, in the process of carrying out the cutting step, the condition of the cutting blade can be adjusted by cutting the dresser, whereby enhancement of processing quality of grooving the workpiece is realized, and generation of defective products of the workpiece can be reduced. In addition, with the thickness of the dresser set equal to that of the workpiece, a region of the cutting edge of the cutting blade having cut into the workpiece can be thoroughly dressed by the dresser.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 2 is a perspective view depicting a configuration example of a cutting unit and the like;

DETAILED DESCRIPTION OF THE PREFERRED EMBODIMENT

Figure 1:
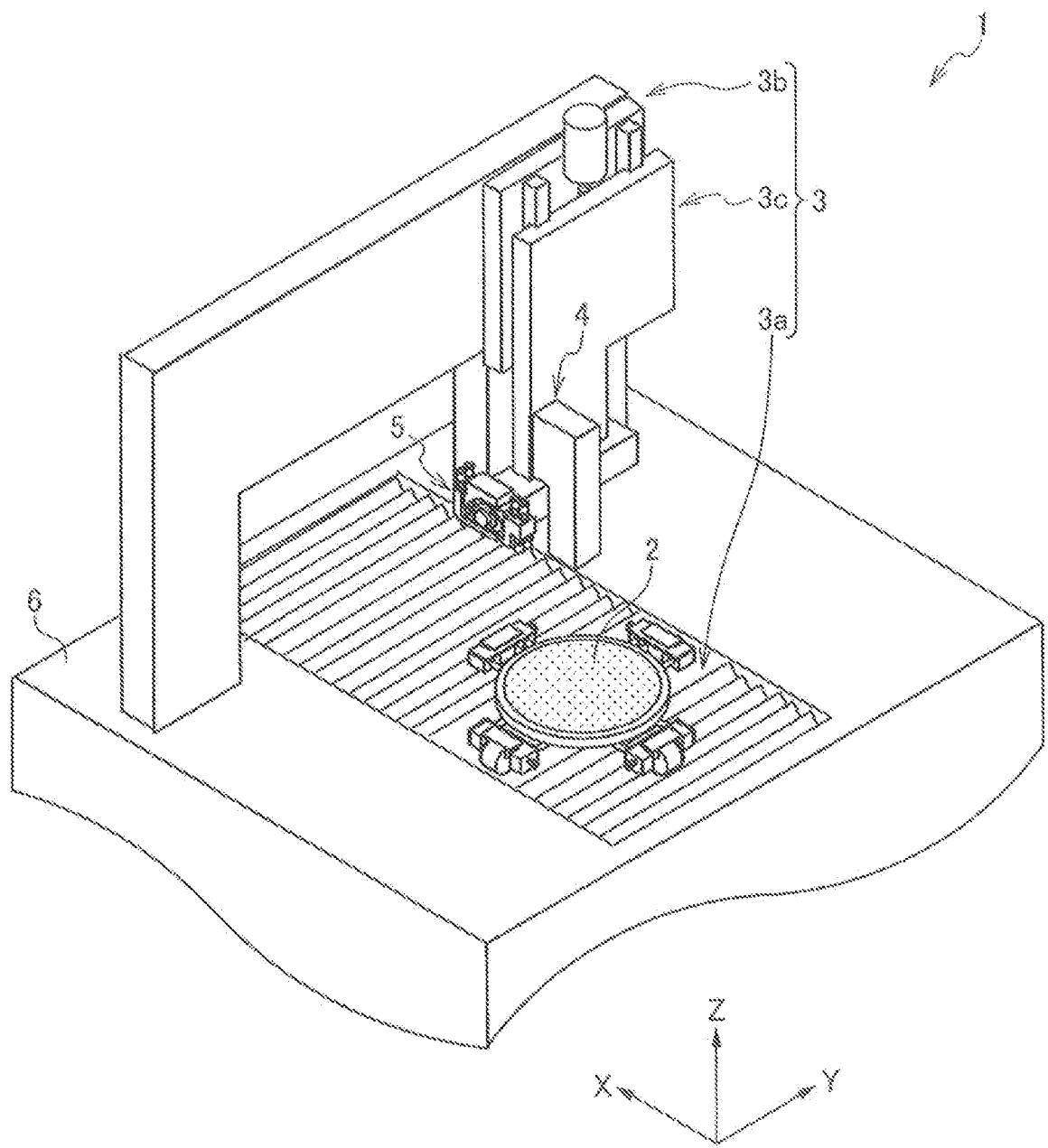
FIG. 1 is a perspective view depicting a configuration example of a cutting apparatus used to carry out the present invention.

An embodiment of the present invention will be described below referring to the drawings, as required. FIG. 1 is a configuration example of a cutting apparatus 1 used to carry out the present invention. The cutting apparatus 1 includes a holding table 2, a moving mechanism 3, an imaging unit 4, and a cutting unit 5.

The holding table 2 suction holds a workpiece. The holding table 2 is formed in a disk shape, and an upper surface thereof is formed as a flat surface parallel to horizontal directions. The holding table 2 includes a porous ceramic and is connected to a vacuum suction source, not illustrated.

The moving mechanism 3 relatively moves the holding table 2 and the cutting unit 5 in an X-axis direction, a Y-axis direction, and a Z-axis direction. The moving mechanism 3 includes an X-axis direction moving mechanism 3a, a Y-axis direction moving mechanism 3b, and a Z-axis direction moving mechanism 3c.

More specifically, the X-axis direction moving mechanism 3a is for moving the holding table 2 in the X-axis direction (corresponding to a processing feeding direction) relative to a main body section 6. The Y-axis direction moving mechanism 3b is for supporting the cutting unit 5 such that the cutting unit 5 can be moved in the Y-axis direction (corresponding to an indexing feeding direction) relative to the main body section 6. The Z-axis direction moving mechanism 3c is for supporting the cutting unit 5 such that the cutting unit 5 can be moved in the Z-axis direction (corresponding to a cutting-in feeding direction) relative to the main body section 6. Each of the moving mechanisms 3a to 3c can include a motor, a ball screw, and the like, and the configuration thereof is not particularly limited.

The imaging unit 4 images the workpiece and detects edges of the workpiece, thereby to enable alignment of the position of the cutting unit 5 in the Y-axis direction, for an adjustment for alignment of the cutting unit 5 relative to a processing line of the workpiece. The imaging unit 4 is, for example, a camera using a charge coupled device (CCD) image sensor.

Figure 2:
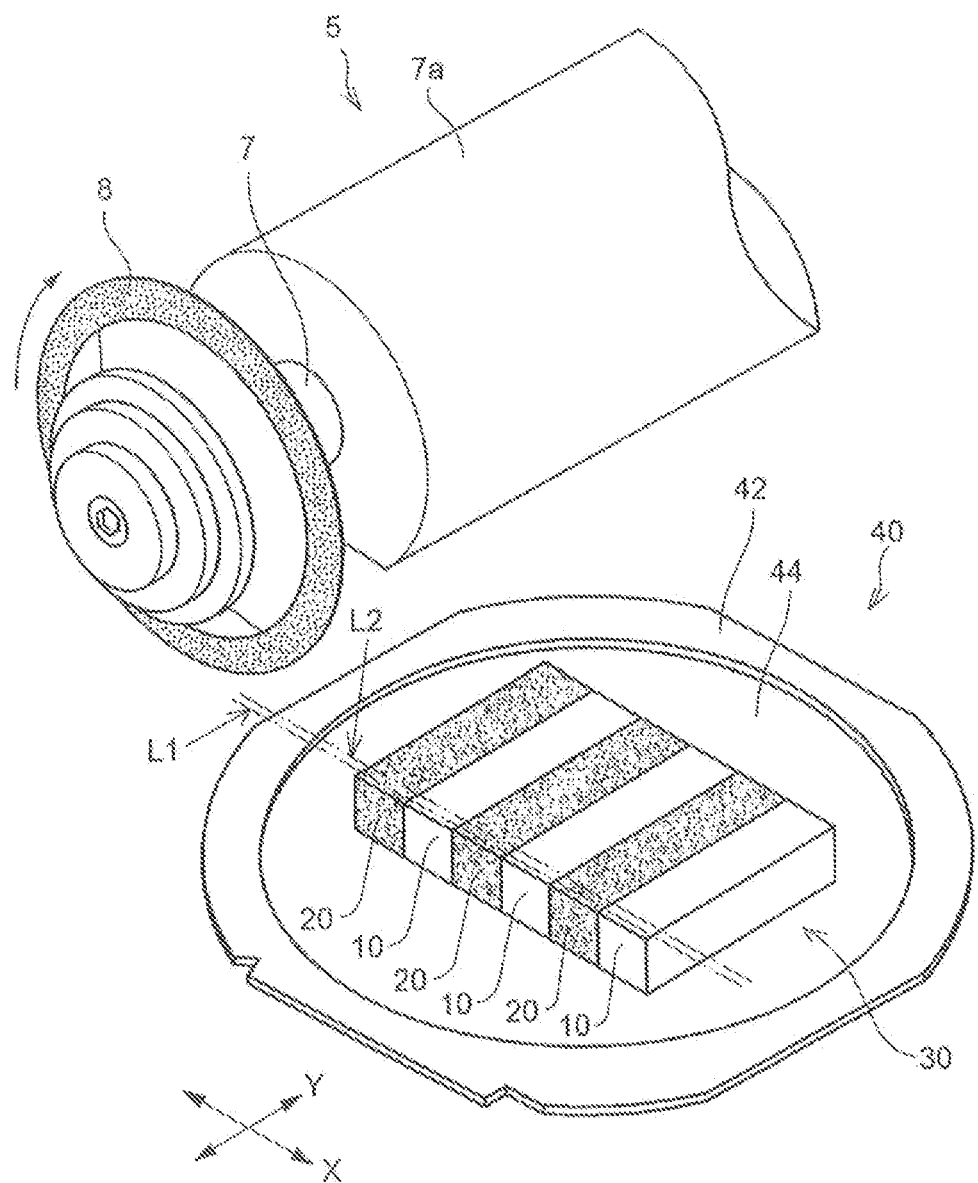

The cutting unit 5 is for grooving the workpiece by cutting. As illustrated in FIG. 2, the cutting unit 5 includes a cutting blade 8 detachably fixed to a tip portion of a spindle 7 projecting from a spindle housing 7a, and a motor, not illustrated, for rotating the spindle 7 at a high speed.

Figure 3:
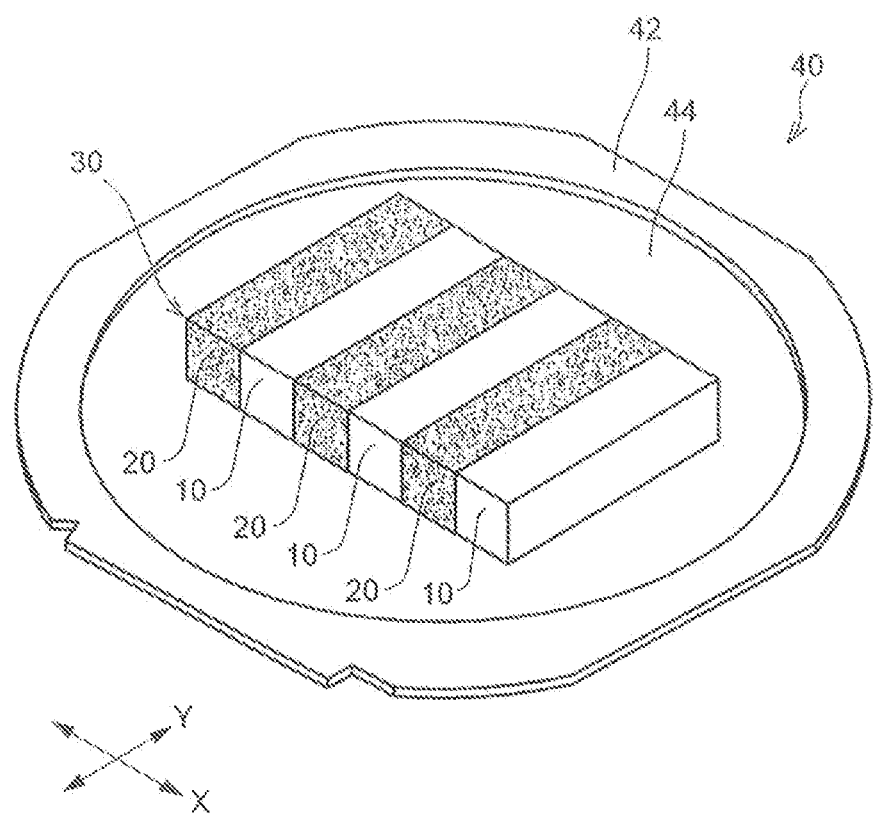
FIG. 3 is a perspective view depicting a configuration example of a frame unit.

In the cutting apparatus configured as above, processing of the workpiece body is conducted as follows. FIG. 3 is a diagram depicting a state in which a workpiece body 30 including a plurality of workpieces 10 and a plurality of dressers 20 is attached to an annular frame 42 in a handleable manner. The workpiece body 30 is adhered to an adhesive surface of a tape 44 to be thereby configured as one body with the annular frame 42, and these components are configured, and can be handled, as one frame unit 40 as a whole.

As depicted in FIG. 3, the workpiece 10 is expected to be formed with a plurality of grooves in a first direction (X-axis direction) at a predetermined interval in a second direction (Y-axis direction) orthogonal to the first direction in a horizontal plane including the first direction.

As illustrated in FIG. 3, the workpiece 10 is, for example, an ultrasonic oscillator in which rectangular vibrators are arranged in an array, and grooves extending in the first direction are formed at a predetermined interval in the second direction, whereby the rectangular vibrators are formed.

Note that the workpiece 10 is not limited to the ultrasonic oscillator, and the present invention is widely applicable to those in which a plurality of grooves are formed in parallel to each other at a predetermined interval.

As depicted in FIG. 3, the dresser (dressing material) 20 has, for example, white alundum (WA), green carborundum (GC), diamond, cubic boron nitride (CBN), and the like bound by a bond material such as a resin, a vitrified, and a metal, and is designed as required according to the kind of the cutting blade.

The dresser 20 is for the purpose of performing dressing for canceling dulling, clogging, or the like of the cutting blade by causing the cutting blade to cut into the dresser 20, thereby adjusting the condition of the cutting blade.

As illustrated in FIG. 3, in the present embodiment, the workpiece 10 is configured to be rectangular parallelepiped in shape elongate in the second direction, and the dresser 20 is also configured in substantially the same shape.

As depicted in FIG. 3, the thickness of the dressers 20 in a third direction (Z-axis direction) is a predetermined thickness, for example, a thickness equal to or more than the thickness of the workpieces 10, and is preferably set substantially equal to the thickness of the workpieces 10. As a result, the cutting-in depth of the cutting blade into the dressers 20 can be made to be equal to or more than the cutting-in depth D (FIG. 8) into the workpieces 10, and a region of a cutting edge 8a of the cutting blade having cut into the workpieces 10 can be thoroughly dressed by the dressers 20. Note that it is sufficient that "the predetermined thickness" is in such a range that the cutting blade can be securely dressed by the dressers 20 and that chattering of the cutting blade at boundary parts between the workpieces 10 and the dressers 20 can be securely restrained.

In FIG. 3, the width of the dressers 20 in the first direction may be the same as that of the workpieces 10, or may be different from that of the workpieces 10, and can be designed as required according to the kind of the cutting blade.

As illustrated in FIG. 3, in the present embodiment, the workpieces 10 and the dressers 20 are disposed adjacent to each other without gaps therebetween in the first direction. As a result, at the time of cutting, continuous processing is performed without interruption at the boundary parts between the workpieces 10 and the dressers 20, and chattering of the cutting blade at the boundary parts can be restrained.

In addition, in a case where the workpiece body 30 including the plurality of workpieces 10 and the plurality of dressers 20 is configured, with the workpieces 10 and the dressers 20 disposed without gaps therebetween, the cutting distance in the first direction can be shortened, and a reduction in processing time can be realized.

Next, an example of the procedure of cutting will be described below.

<Dresser Preparing Step>

This step is a step of preparing the dresser 20 of a predetermined shape.

Figure 4:
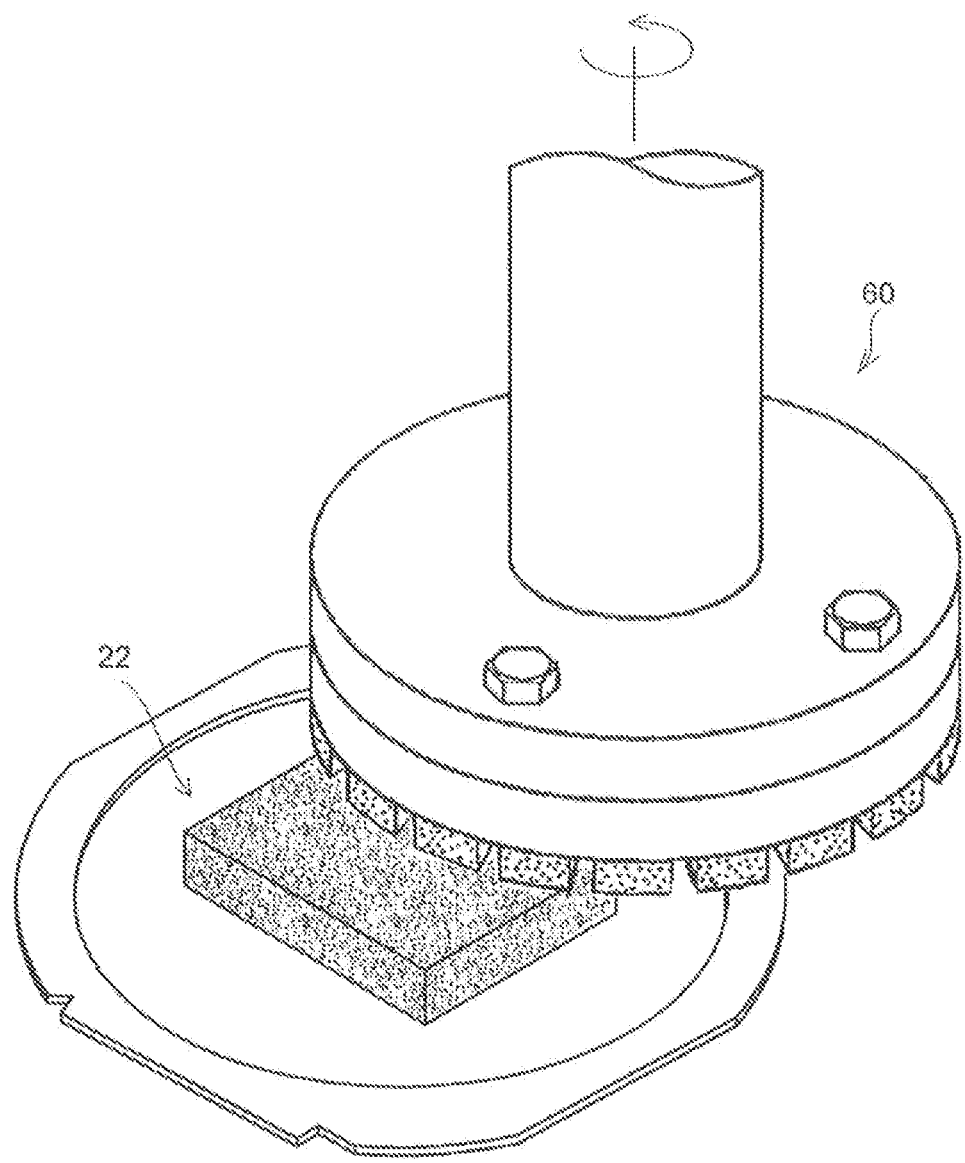
FIG. 4 is a perspective view depicting a processing example in which a dressing material board is ground to adjust to a predetermined thickness.

FIG. 4 depicts a processing example in which one sheet of large-sized dressing material board 22 is ground by a grinding wheel 60 of another grinding apparatus, not illustrated, to adjust to a predetermined thickness. The predetermined thickness here may be substantially the same thickness as that of the workpiece 10 (FIG. 3), or may be set according to the kinds of the workpiece 10 (FIG. 3), the dressing material board 22, and the cutting blade 8 (FIG. 2).

Figure 5:
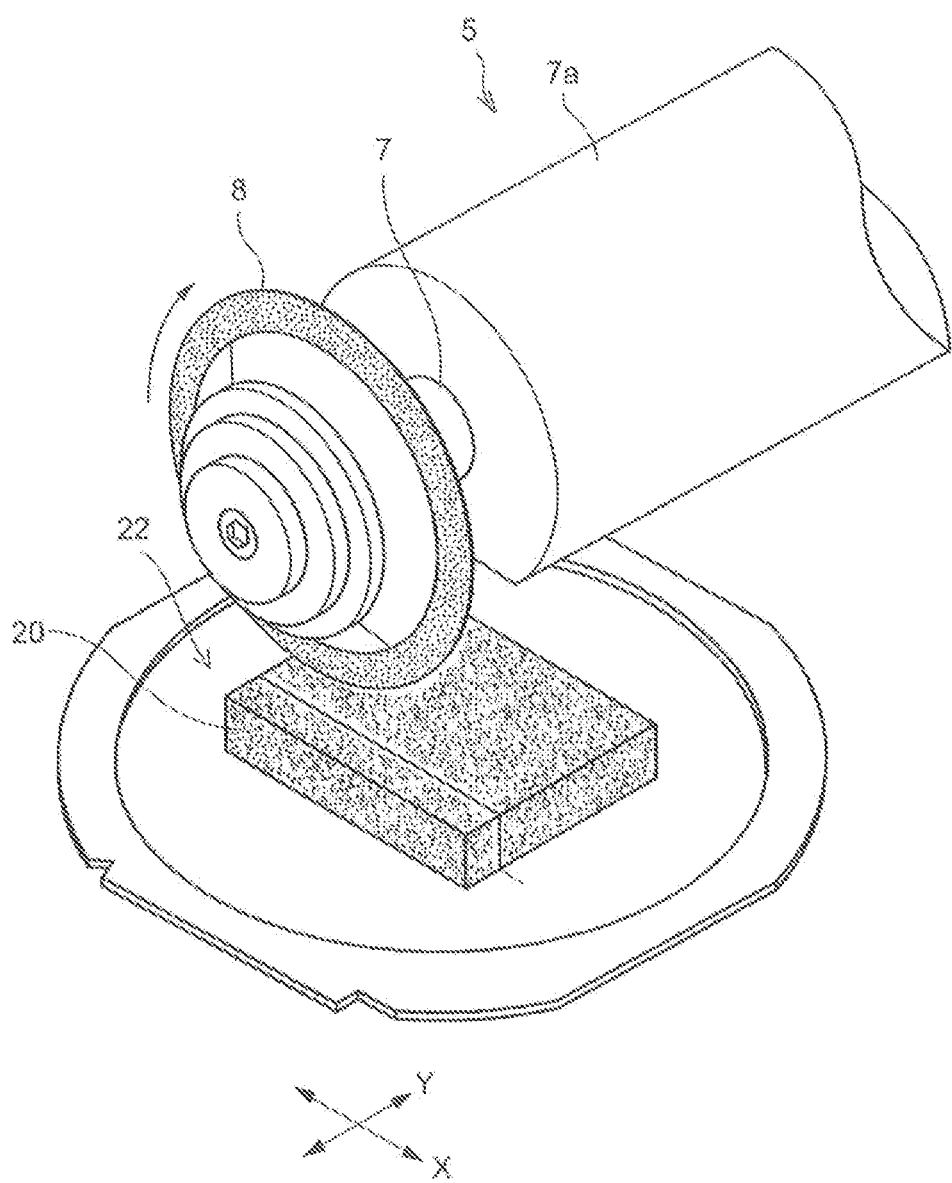
FIG. 5 is a perspective view depicting a processing example for dividing the dressing material board into dressers having a predetermined width.

FIG. 5 depicts a processing example in which one sheet of large-sized dressing material board 22 is cut by the cutting unit 5 to divide into dressers 20 having a predetermined width. Note that the division may be performed by the cutting unit 5 provided in the cutting apparatus 1 depicted in FIG. 1, or may be conducted by another cutting apparatus 1.

In the manner as mentioned above, the dressers 20 having a predetermined thickness and a predetermined width can be formed. Note that the grinding and the cutting in FIGS. 4 and 5 may be performed in the reverse order. In addition, the large-sized dressing material board 22 may be processed to form the dressers 20 by cutting the one sheet of the large-sized dressing material board 22, as depicted in FIG. 4, or dressers 20 having a predetermined thickness and a predetermined width may be preliminarily formed to prepare the dressers 20.

<Fixing Step>

This is a step of fixing the workpieces 10 and the dressers 20, adjacently to each other, to the tape 44 serving as a support member such that the workpieces 10 and the dressers 20 can be handled.

In the example of FIG. 3, the workpieces 10 and the dressers 20 are adhered to the tape 44 such as to be disposed alternately in the first direction which is the processing feeding direction, whereby one united workpiece body 30 is configured. The workpiece body 30 is united with the annular frame 42 through the tape 44 and can thereby be handled as the frame unit 40.

Figure 6A:
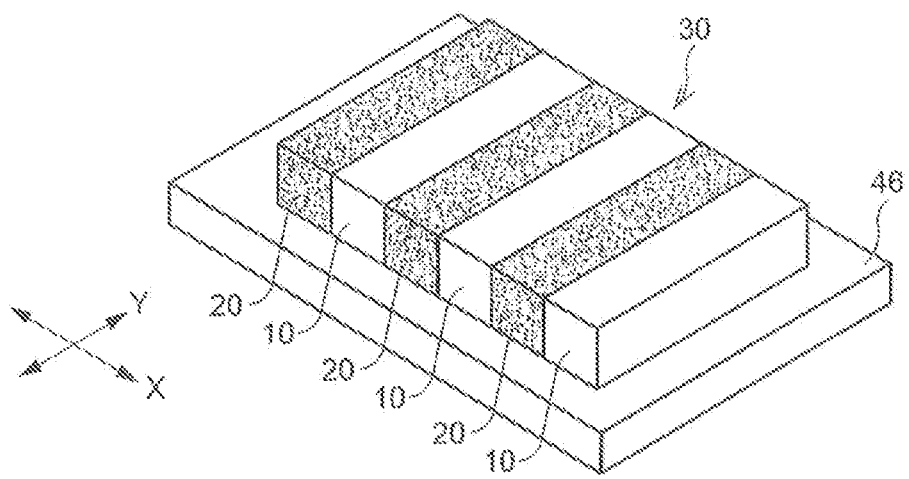
FIG. 6A is a perspective view depicting an example in which a workpiece is configured as a plate-shaped support member.

Note that the frame unit 40 is configured to be handled as in the example of FIG. 3, or the workpiece body 30 may be configured by fixing the workpieces 10 and the dressers 20 to, for example, a plate-shaped support member 46 formed of a glass, a resin, carbon, or the like, as depicted in FIG. 6A.

Figure 6B:
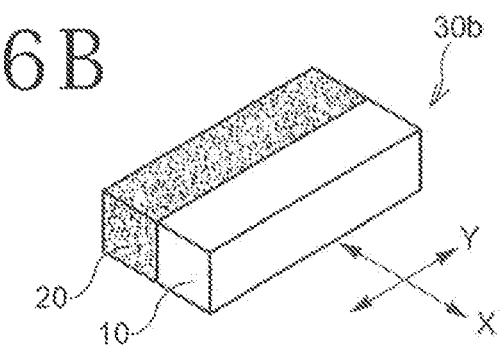
FIG. 6B is a perspective view depicting a configuration example of the workpiece.
Figure 6C:
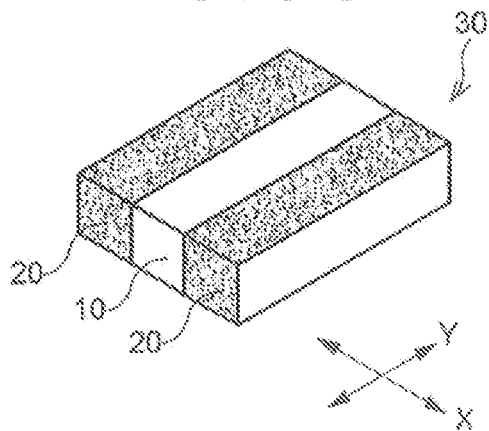
FIG. 6C is a perspective view depicting another configuration example of the workpiece.
Figure 6D:
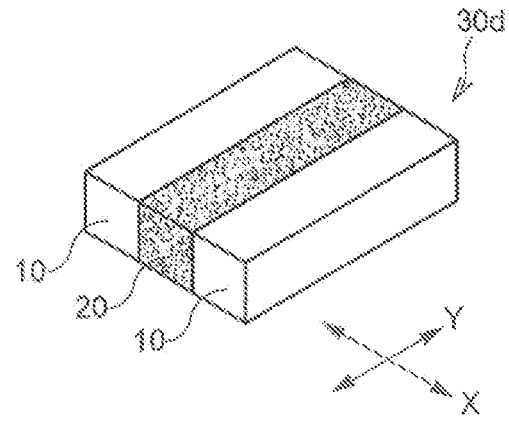
FIG. 6D is a perspective view depicting still another configuration example of the workpiece.

In addition, a workpiece body 30b having one workpiece 10 and one dresser 20 may be configured as depicted in FIG. 6B, a workpiece body 30c having one workpiece 10 interposed between two dressers 20 may be configured as depicted in FIG. 6C, or a workpiece body 30d having one dresser 20 interposed between two workpieces 10 may be configured as depicted in FIG. 6D.

<Holding Step>

Figure 7:
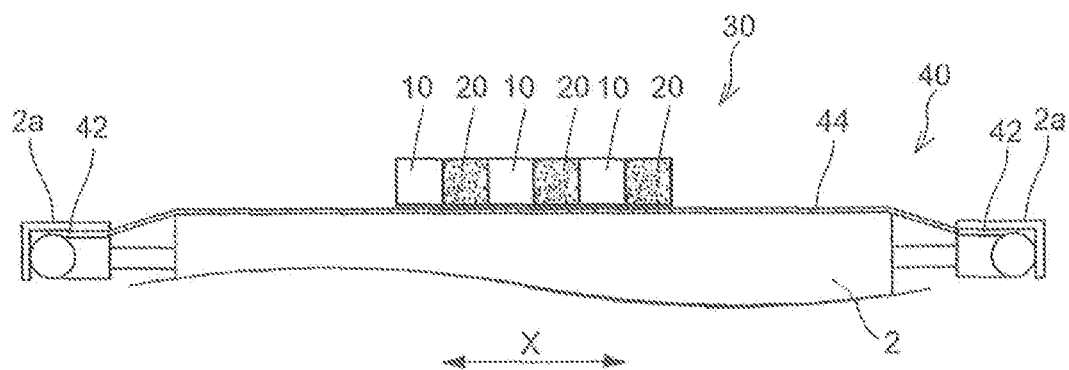
FIG. 7 is a partially sectional side view depicting a holding step.

This is a step of carrying the frame unit 40 to the holding table 2, clamping the annular frame 42 of the frame unit 40 by clamps 2a, and suction holding the workpiece body 30b by the holding table 2 through the tape 44, as illustrated in FIG. 7.

<Cutting Step>

Figure 8:
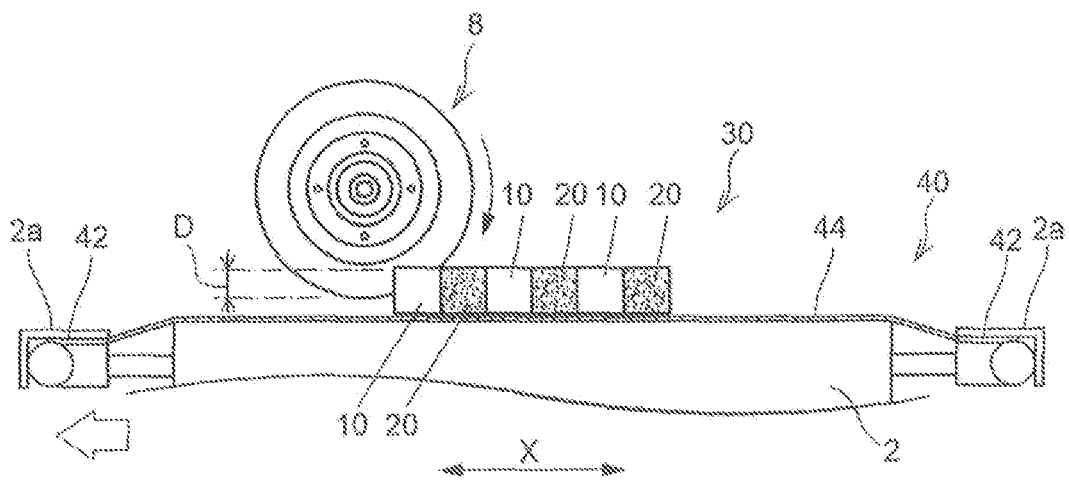
FIG. 8 is a partially sectional side view depicting a cutting step.

This is a step of positioning the tool edge of the cutting blade 8 at a predetermined height, and putting the holding table 2 into processing feeding in the first direction, thereby grooving the workpieces 10, as illustrated in FIGS. 2 and 8.

In the example of FIG. 8, the cutting blade 8 cuts into the first workpiece 10 by a cutting-in depth D, and, when grooving of the first workpiece 10 is finished, dressing by the first dresser 20 is conducted to adjust the condition of the cutting blade 8. Then, grooving of the second workpiece 10 can be performed by the cutting blade 8 adjusted in the condition, and, after dressing by the final dresser 20 is conducted, grooving of the first row L1 (FIG. 2) can be completed.

After the grooving of the first row L1 (FIG. 2) is finished, the position of the cutting blade 8 is moved in the second direction (Y-axis direction) (indexing feeding), and grooving of the second row L2 (FIG. 2) is performed. Since dressing is conducted at the last of processing of the first row L1, grooving of the first workpiece 10 in the second row L2 can be performed by the cutting blade 8 whose condition has been adjusted, so that high processing quality can be realized.

Note that the arranging order of the workpiece 10 and the dresser 20 depicted in FIG. 8 may be reversed, and grooving of the workpiece 10 may be performed after dressing by the dresser 20 is conducted. In this case, dressing by the dresser 20 is performed after grooving of the workpiece 10, the condition of the cutting blade is adjusted at a stage before grooving of the next workpiece 10, and processing quality of the grooving can be enhanced.

According to the processing method as above, in the process in which the cutting step is carried out, the condition of the cutting blade 8 can be adjusted by cutting the dresser 20, so that processing quality of grooving of the workpiece 10 can be enhanced, and generation of defective products of the workpiece 10 can be reduced. In addition, with the thickness of the dresser 20 set to be the same as that of the workpiece 10, a region of the cutting edge 8a of the cutting blade having cut into the workpiece 10 can be thoroughly dressed by the dresser 20.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A workpiece processing method for grooving a first and a second workpiece by a cutting blade, the workpiece processing method comprising:
a dresser preparing step of preparing a first and a second dresser of a predetermined thickness;
a fixing step of fixing the first workpiece, the first dresser, the second workpiece, and the second dresser on a support member, arranged in that order in a first direction and directly adjacent to each other in the first direction such that there are no gaps between the workpieces and the adjacent dresser(s);
a holding step of holding the support member by a holding table, after the fixing step is performed; and
a cutting step of positioning a tool edge of the cutting blade at a predetermined height and causing the cutting blade to perform cutting of the workpieces and of the dressers by moving the workpieces and the dressers in the first direction, after the holding step is performed.

2. The workpiece processing method according to claim 1, wherein, in the fixing step, further comprising fixing an additional dresser, wherein the additional dresser is fixed on an opposing side of the first workpiece in the first direction from where the first dresser is located.

3. The workpiece processing method according to claim 1, wherein, in the fixing step, further comprising fixing an additional workpiece, wherein the additional workpiece is fixed on an opposing side of the second dresser in the first direction from where the second workpiece is located.

4. The workpiece processing method according to claim 1, further comprising providing a third workpiece and a third dresser, wherein the third workpiece and the third dresser are arranged on and fixed to the support member.

5. The workpiece processing method according to claim 1, wherein the dressers comprise white alundum, green carborundum, diamond, and cubic boron nitride bound by a bond material.

6. The workpiece processing method according to claim 1, wherein the dressers and the workpieces have substantially equal thicknesses.

* * * * *